(12) United States Patent
Cao et al.

(10) Patent No.: US 10,628,197 B2
(45) Date of Patent: Apr. 21, 2020

(54) INTELLIGENT DEPLOYMENT OF VIRTUAL PROCESSING INSTANCES FROM OPEN VIRTUAL APPLIANCE TEMPLATES

(71) Applicant: VMware, Inc., Palo Alto, CA (US)

(72) Inventors: Yanping Cao, San Carlos, CA (US); Pratik Kapadia, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 148 days.

(21) Appl. No.: 15/655,771

(22) Filed: Jul. 20, 2017

(65) Prior Publication Data
US 2019/0026138 A1 Jan. 24, 2019

(51) Int. Cl.
*G06F 9/455* (2018.01)
*G06F 16/13* (2019.01)
*G06F 16/182* (2019.01)
*G06F 8/61* (2018.01)

(52) U.S. Cl.
CPC ............ *G06F 9/45558* (2013.01); *G06F 8/63* (2013.01); *G06F 16/13* (2019.01); *G06F 16/183* (2019.01); *G06F 2009/4557* (2013.01); *G06F 2009/45562* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 6,718,373 | B1 * | 4/2004 | Bearden | G06F 8/61 709/220 |
| 7,356,679 | B1 * | 4/2008 | Le | G06F 9/45558 713/1 |
| 8,990,809 | B1 * | 3/2015 | Jacob | G06F 9/45533 718/1 |
| 9,081,747 | B1 * | 7/2015 | Tabieros | G06F 9/4411 |
| 9,965,490 | B2 * | 5/2018 | Gerdts | G06F 16/188 |
| 10,048,890 | B1 * | 8/2018 | Samad | G06F 3/0664 |
| 10,108,460 | B2 * | 10/2018 | Gopisetty | G06F 8/60 |
| 2007/0294676 | A1 * | 12/2007 | Mellor | G06F 8/65 717/139 |
| 2010/0332456 | A1 * | 12/2010 | Prahlad | G06F 3/0649 707/664 |
| 2013/0124702 | A1 * | 5/2013 | Shah | G06F 16/23 709/221 |
| 2013/0152080 | A1 * | 6/2013 | Sachindran | G06F 9/44526 718/1 |
| 2014/0075021 | A1 * | 3/2014 | Revanuru | H04L 43/04 709/224 |
| 2014/0075520 | A1 * | 3/2014 | Subramanian | H04L 63/101 726/4 |
| 2014/0137114 | A1 * | 5/2014 | Bolte | G06F 9/45558 718/1 |

(Continued)

*Primary Examiner* — Abu Zar Ghaffari
(74) *Attorney, Agent, or Firm* — Loza & Loza, LLP

(57) ABSTRACT

A management system and method for deploying a virtual processing instance from an open virtual appliance (OVA) template file involves accessing the OVA template file stored on a storage of a computer to stream at least one file from the storage of the computer for processing and to transmit a disk image file of the virtual processing instance in the OVA template file from the storage of the computer to a storage of a destination host computer on which the virtual processing instance is to be deployed.

20 Claims, 10 Drawing Sheets

(56) References Cited

U.S. PATENT DOCUMENTS

| | | | |
|---|---|---|---|
| 2014/0259014 A1* | 9/2014 | Watanabe | G06F 9/5077 718/1 |
| 2014/0373011 A1* | 12/2014 | Anderson | G06F 9/45533 718/1 |
| 2015/0040123 A1* | 2/2015 | Gerdts | G06F 16/188 718/1 |
| 2016/0299708 A1* | 10/2016 | Yang | G06F 9/45558 |
| 2017/0220335 A1* | 8/2017 | Pink | G06F 9/44536 |
| 2017/0371567 A1* | 12/2017 | Piduri | G06F 3/0619 |
| 2018/0136962 A1* | 5/2018 | Kammampati | G06F 9/45558 |
| 2018/0181655 A1* | 6/2018 | Mateev | G06F 9/45533 |

* cited by examiner

INTELLIGENT DEPLOYMENT OF VIRTUAL PROCESSING INSTANCES FROM OPEN VIRTUAL APPLIANCE TEMPLATES

BACKGROUND

OVA (open virtual appliance) template file is a single archive file in TAR file format that contains files for portability and deployment of virtualization appliances. An OVA template file may include an OVF (open virtual format) descriptor file, optional manifest and certificate files, optional disk images (such as VMware vmdk files), optional resource files (such as ISO's) and other supporting files, such as a message bundle file.

In order to deploy a virtual machine (VM) from an OVA template file, the files of the OVA template file, such as OVF descriptor, vmdk, manifest, certificate, and message bundle files, must be retrieved from the OVA template file at different stages of a deployment process, so that the OVA template file can be validated and any needed file is transferred to the destination host computer on which the VM is to be deployed. Thus, if the OVA template file is located at a remote storage location, the entire OVA template file may first have to be downloaded and the files in the OVA template file extracted before the extracted files can be used for deployment. Since the OVA template file is typically a large file, this approach would require significant storage to temporary store the OVA template file.

SUMMARY

A management system and method for deploying a virtual processing instance from an OVA template file involves accessing the OVA template file stored on a storage of a computer to stream at least one file from the storage of the computer for processing and to transmit a disk image file of the virtual processing instance in the OVA template file from the storage of the computer to a storage of a destination host computer on which the virtual processing instance is to be deployed.

A method for deploying a virtual processing instance from an OVA template file in accordance with an embodiment of the invention comprises accessing the OVA template file stored on a storage of a computer from a deployment module running on a computer system, locating, by the deployment module, a particular file in the OVA template file using at least one header of OVA entries in the OVA template file, streaming the particular file from the storage of the computer to the deployment module for processing, locating, by the deployment module, a disk image file of the virtual processing instance in the OVA template file using at least one header of the OVA entries in the OVA template file, and transmitting the disk image file of the virtual processing instance in the OVA template file from the storage of the computer to a storage of a destination host computer on which the virtual processing instance is to be deployed. In some embodiments, the steps of this method are performed when program instructions contained in a computer-readable storage medium are executed by one or more processors.

A management server in accordance with an embodiment of the invention comprises memory and a processor configured to access an OVA template file stored on a storage of a computer, locate a particular file in the OVA template file using at least one header of OVA entries in the OVA template file, stream the particular file from the storage of the computer to the management server for processing, locate a disk image file of a virtual processing instance in the OVA template file using at least one header of the OVA entries in the OVA template file, and transmit the disk image file of the virtual processing instance in the OVA template file from the storage of the computer to a storage of a destination host computer on which the virtual processing instance is to be deployed.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
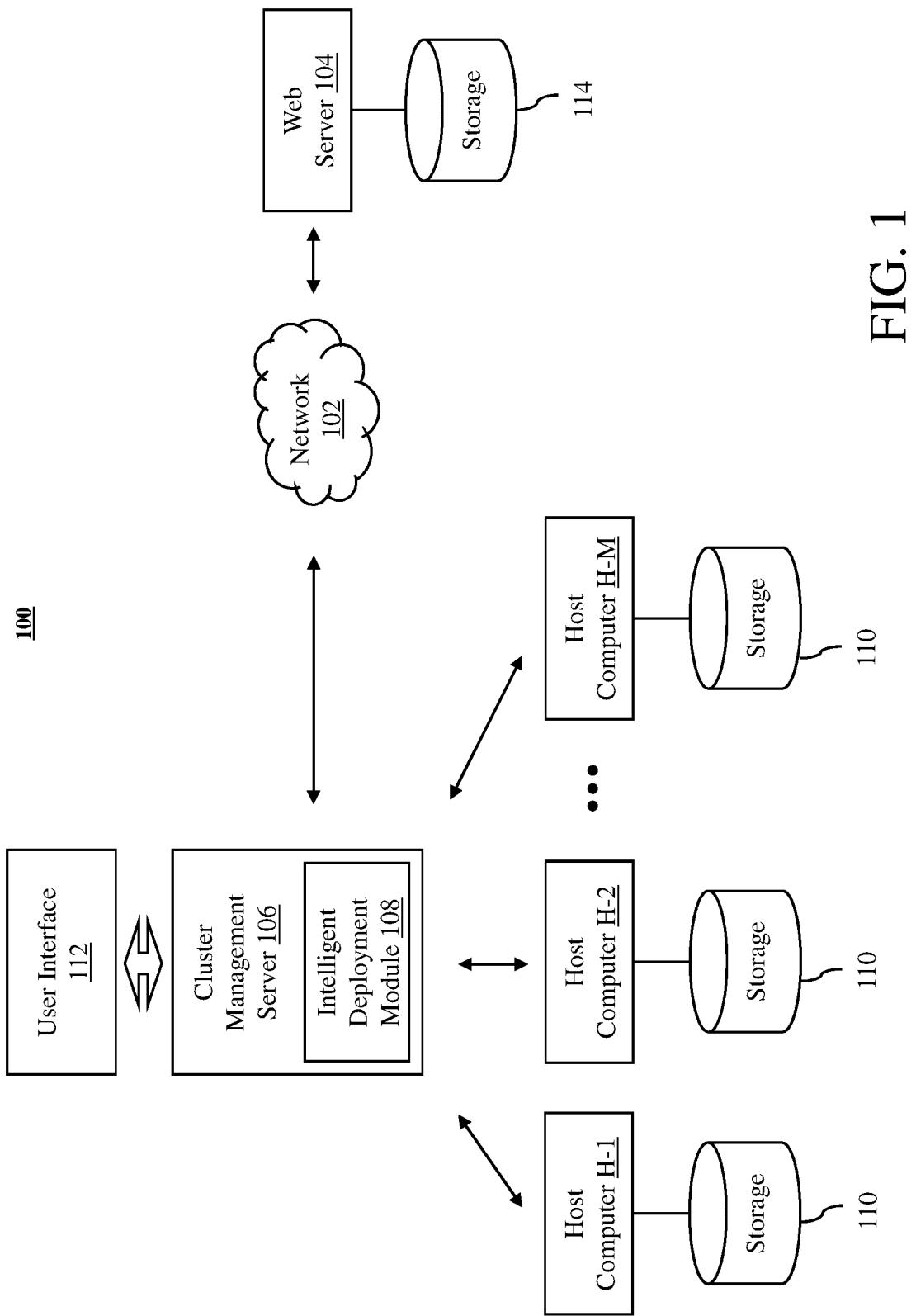
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, a cluster of host computers H-1, H-2 . . . H-M (where M is a positive integer), a web server 104 and a cluster management server 106 with an intelligent deployment module 108. The host computers are physical computer systems that are used to support or host multiple virtual processing instances that can execute various applications. As used herein, the term "virtual processing instance" is any software entity that can run on a computer system, such as a software application, a software process, a virtual machine (VM) and a "container" that provides system-level process isolation, e.g., a Docker container. The host computers may be servers that are commonly found in data centers. As an example, the host computers may be servers installed in one or more server racks. The host computers can be connected to the network 102, and thus may be able to communicate with any component or process connected to the network.

As shown in FIG. 1, each of the host computers H-1, H-2 . . . H-M is connected to a storage 110, which is used to store any data for that host computer, including OVA (open virtual appliance) template files. Each storage may include one or more computer data storage devices, which can be any type of storage devices, such as solid-state devices (SSDs), hard disks or a combination of the two. The storages of the host computers may be local storage devices of the host computers, e.g., locally attached disks or SSDs within the host computers. In some embodiments, the storages of the host computers may be part of a storage system, such a network-attached storage (NAS) and/or a storage area network (SAN). Each storage may support multiple datastores, which are virtualized representations of storage facilities. Thus, each datastore may use the storage resource from more than one storage device included in the storages. The datastores are used to store data associated with the virtual processing instances supported by the host computers.

Figure 2:
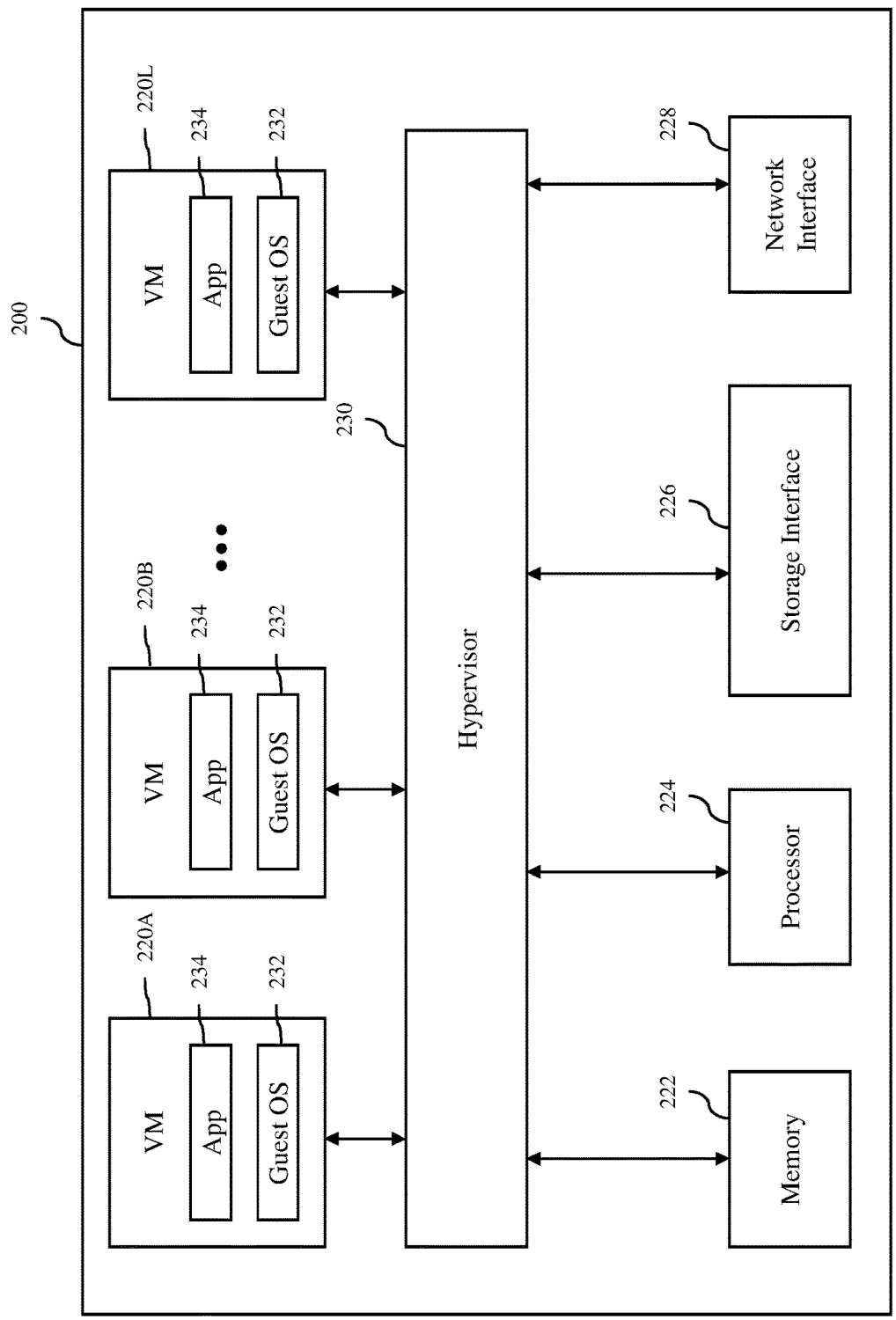
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of virtual processing instances 220A, 220B . . . 220L (where L is a positive integer), which are VMs in this embodiment. The number of VMs supported by the host computer can be anywhere from one to more than a hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows the host computer to communicate with the storage that is accessible by the host computer. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide virtualized computer systems that give the appearance of being distinct from the host computer and from each other. Each VM includes a guest operating system (OS) 232 and one or more guest applications (APP) 234. The guest operating system 232 manages virtual system resources made available to the corresponding VM by the hypervisor 230, and, among other things, the guest operating system forms a software platform on top of which the guest applications 234 run.

Similar to any other computer system connected to the network 102, the VMs 220A, 220B . . . 220L are able to communicate with other computer systems connected to the network using the network interface 228 of the host computer 200. In addition, the VMs are able to access the storage accessible by the host computer using the storage interface 226 of the host computer.

Turning back to FIG. 1, the cluster management server 106 operates to monitor and manage the host computers H-1, H-2 . . . H-M. The cluster management server may be configured to monitor the current configurations of the host computers and the virtual processing instances, e.g., VMs, running on the host computers. The monitored configurations may include hardware configuration of each of the host computers, such as CPU type and memory size, and/or software configurations of each of the host computers, such as operating system (OS) type and installed applications or software programs. The monitored configurations may also include virtual processing instance hosting information, i.e., which virtual processing instances are hosted or running on which host computers. The monitored configurations may also include virtual processing instance information. The virtual processing instance information may include size of each of the virtual processing instances, virtualized hardware configuration of each of the virtual processing instances, such as virtual CPU type and virtual memory size, software configuration of each of the virtual processing instances, such as OS type and installed applications or software programs running on each of the virtual processing instances, and virtual storage size for each of the virtual processing instances. The virtual processing instance information may also include resource parameter settings, such as demand, limit, reservation and share values for various resources, e.g., CPU, memory, network bandwidth and storage, which are consumed by the virtual processing instances. The "demand," or current usage, of the virtual processing instances for the consumable resources, such as CPU, memory, network, and storage, are measured by the host computers hosting the virtual processing instances and provided to the cluster management server.

The cluster management server 106 may also perform operations to manage the virtual processing instances and the host computers H-1, H-2 . . . H-M. The cluster management server may be configured to perform various resource management operations for the cluster, including migration of virtual processing instances between the host computers in the cluster for load balancing. The cluster management server may also be configured to manage deployment of virtual processing instances in any of the host computers using templates, such as OVA files, as explained below.

In some embodiments, the cluster management server 106 may be a physical computer that includes at least memory and one or more processors, similar to the host computer 200. In other embodiments, the cluster management server may be implemented as software program running on a physical computer, such as the host computer 200 shown in FIG. 2, or a virtual computer, such as one of the VMs 220A, 220B . . . 220L. In an implementation, the cluster management server is a VMware® vCenter™ server with at least some of the features available for such server.

In the illustrated embodiment, the cluster management server 106 includes the intelligent deployment module 108, which performs various deployment-related operations so that virtual processing instances can be deployed in the host computers H-1, H-2 . . . H-M using OVA template files on servers, such as the host computers and the web server 104, without having to download and store the entire OVA files from their sources. As described in more detail below, the intelligent deployment module 108 selectively accesses files in an OVA template file, which is stored at a remote storage, i.e., storage that cannot be accessed directly by the cluster management server 106, at different times during a deployment process of a virtual processing instance, such as a VM, to perform deployment-related operations without having to download and store the entire OVA file. The largest file in the OVA file, which is a disk image file for the virtual processing instance being deployed, is streamed or downloaded directly to the destination host computer on which the virtual processing instance is to be deployed.

The cluster management server 106, including the intelligent deployment module 108, can be accessed via a user interface 112, which may be a web-based user interface. The user interface 112 allows a user to deploy virtual processing instances in any of the host computers H-1, H-2 . . . H-M using OVA template files, which may be stored in the storage of the computer system on which the user interface is running or may be stored in remote storages of servers, e.g., web servers. The user interface allows the user to select the OVA template file from which to deploy a virtual processing instance and the destination host computer to which the virtual processing instance is to be deployed. In an embodiment, for an OVA template file stored in a remote storage of a web server, the user may have to enter the URL of the stored OVA template file for deployment. As for an OVA template file stored in the storage 110 of one of the host computers H-1, H-2 . . . H-M, the user may have to enter the file address of the stored OVA template file for deployment.

The web server 104 operates to store, process and deliver content, such as web pages and files, e.g., OVA template files. In an embodiment, communications with the web server can be made using Hypertext Transfer Protocol (HTTP). The web server is connected to a storage 114 so that content stored in the storage can be delivered to a requesting entity, such as the intelligent deployment module 108. The storage 114 can be any type of computer data storage, such as local storage for the web server, a NAS or a SAN. Web servers, such as the web server 104, are well known in the art. Thus, the web server 104 is not described in more detail herein. Although only one web server is shown in FIG. 1, there can be any number of web servers that can be accessed by the intelligent deployment module 108. The web server 104 is shown in FIG. 1 to represent these possible web servers.

Using the intelligent deployment module 108, virtual processing instances can be deployed in any of the host computers H-1, H-2 . . . H-M in the distributed computer system 100 using OVA template files stored in the storages 110 of the host computers or the storages of the web servers, such as the storage 114 of the web server 104. In the following description, the deployment process executed in the distributed computer system 100 in accordance with embodiments of the invention will be described as deploying VMs. However, the deployment process may be used for deploying other virtual processing entities.

Figure 3:
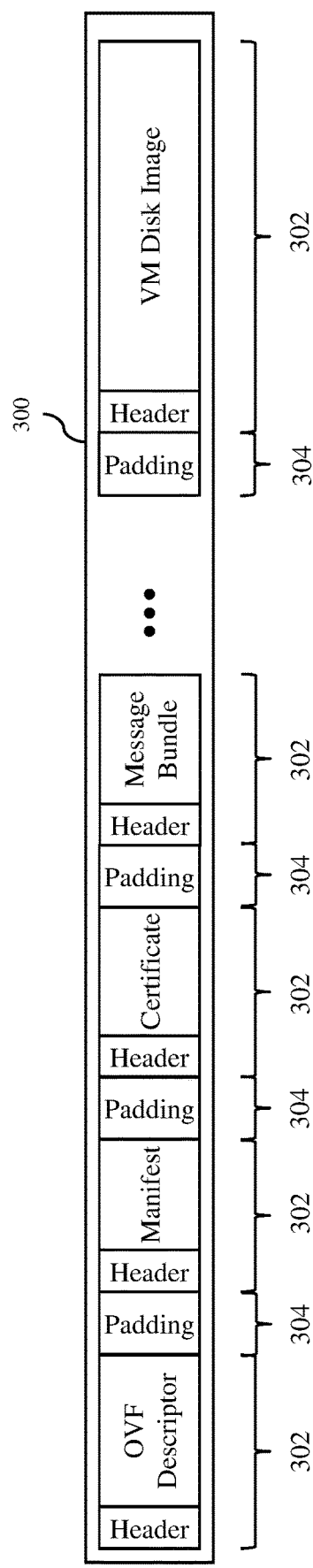
FIG. 3 is a diagram of an example of an OVA template file for deploying a VM.

Turning now to FIG. 3, an example 300 of an OVA template file for VM deployment is illustrated. In accordance with a TAR file format, the OVA file 300 includes a number of OVA entries 302 that are separated by end of file (EOF) padding regions 304. For each entry in the OVA file, there is a file and a header, which includes various information regarding the file. The header includes, among other information, the file name and the file size. In the example of FIG. 3, the OVA file includes an OVF (open virtual format) descriptor file, a manifest file, a certificate file, a message bundle file and a virtual machine disk image (e.g., vmdk) file. The OVF descriptor file includes descriptions regarding the contents of the OVA file, such as names of files included in the OVA file. In an embodiment, the manifest file contains the SHA1 digest of all files in the OVA template file, and the certificate file contains a signed digest for the manifest file and an X.509 certificate. The message bundle file contains localized messages for different locales for messages in the OVF descriptor file. Although the manifest, certificate and message bundle files are shown as being positioned before the virtual machine disk image file in the OVA file, in other OVA files for VM deployment, one or more of these files may be positioned after the virtual machine disk image file. The virtual disk image file is an image file of a virtual disk of the VM being deployed.

Figure 4:
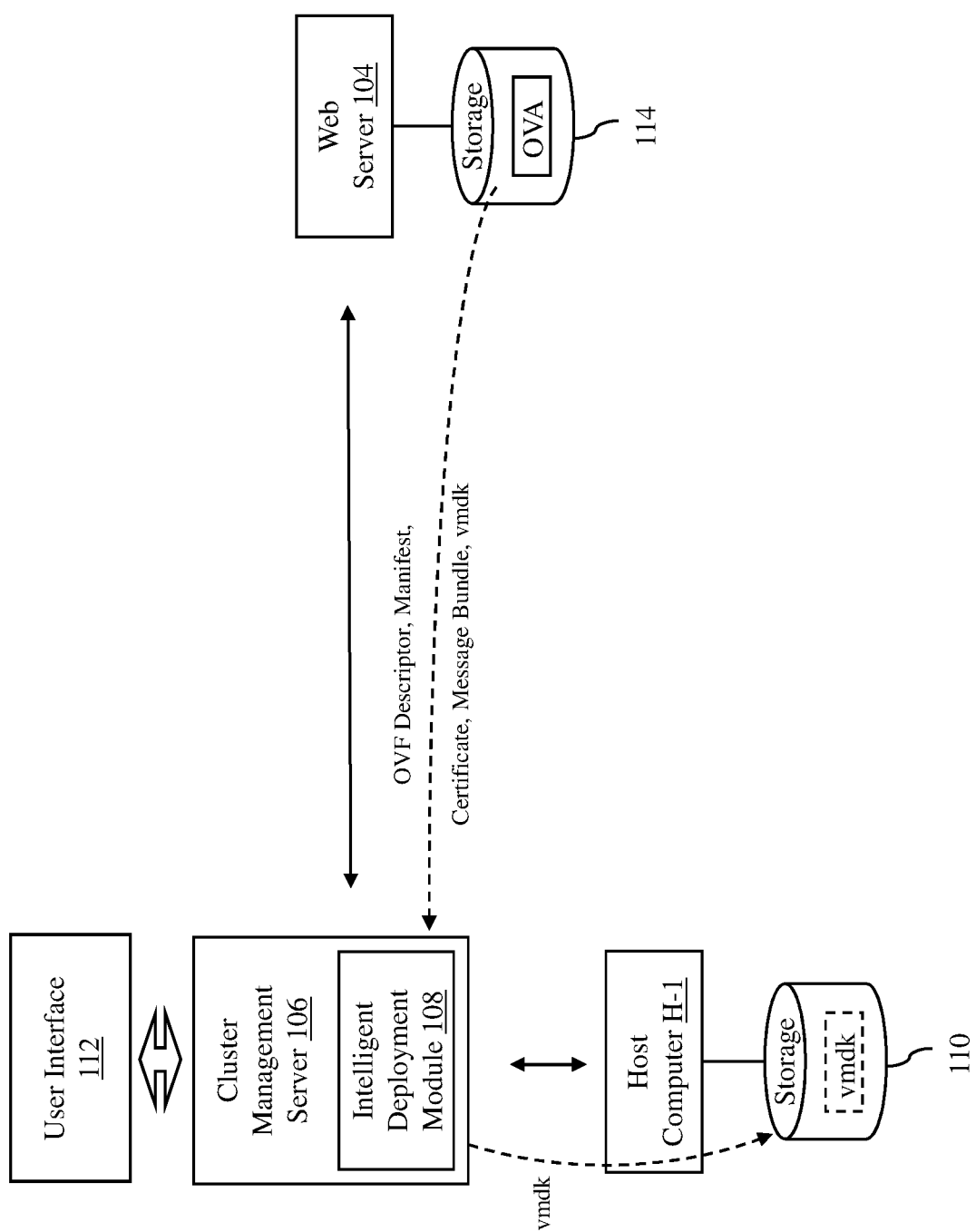
FIG. 4 is a diagram illustrating a VM being deployed from an OVA template file stored on a web server in accordance with an embodiment of the invention.
Figure 5A:
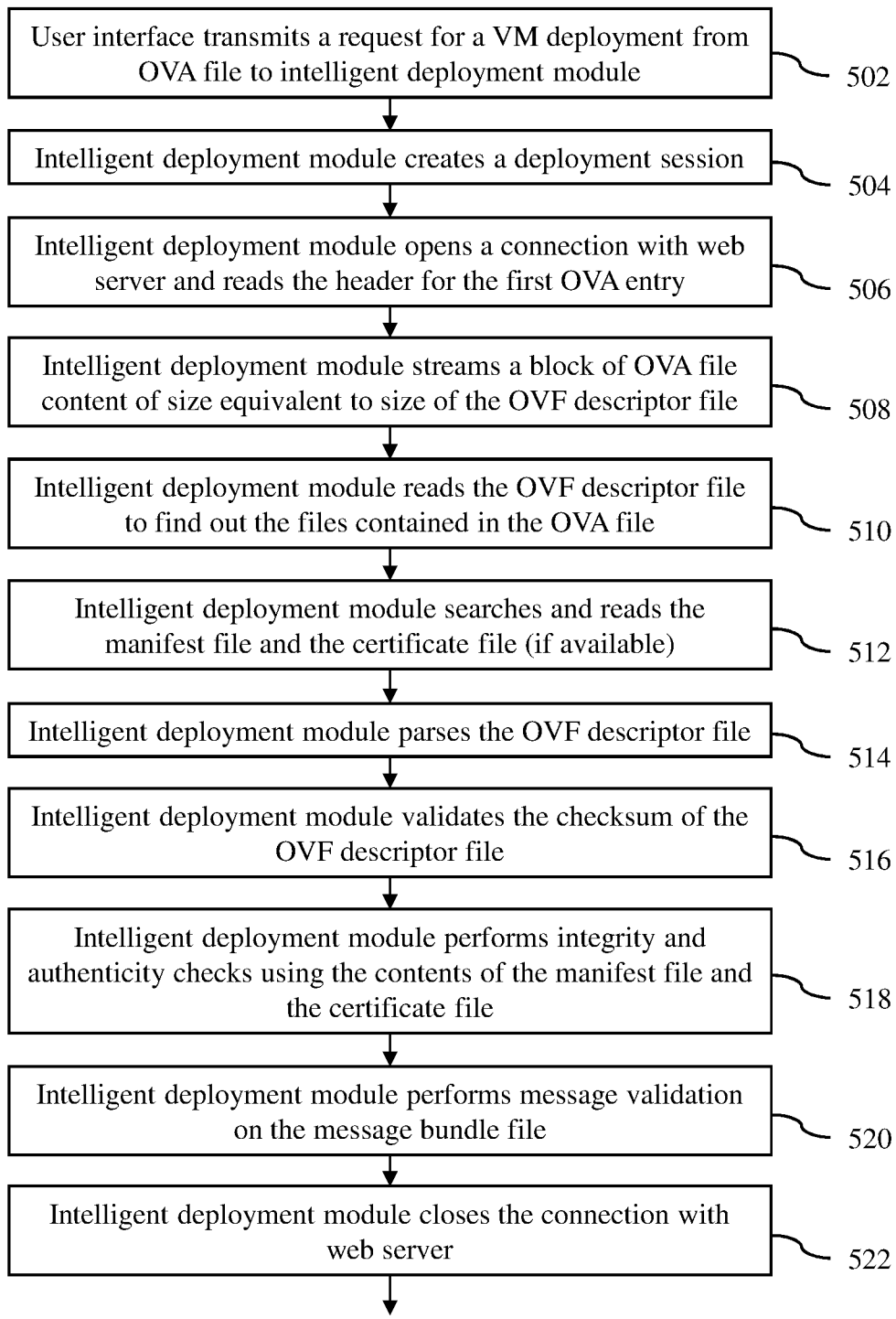
FIGS. 5A and 5B show a flow diagram of a process of deploying a VM from an OVA template file stored on a web server in accordance with an embodiment of the invention.
Figure 5B:
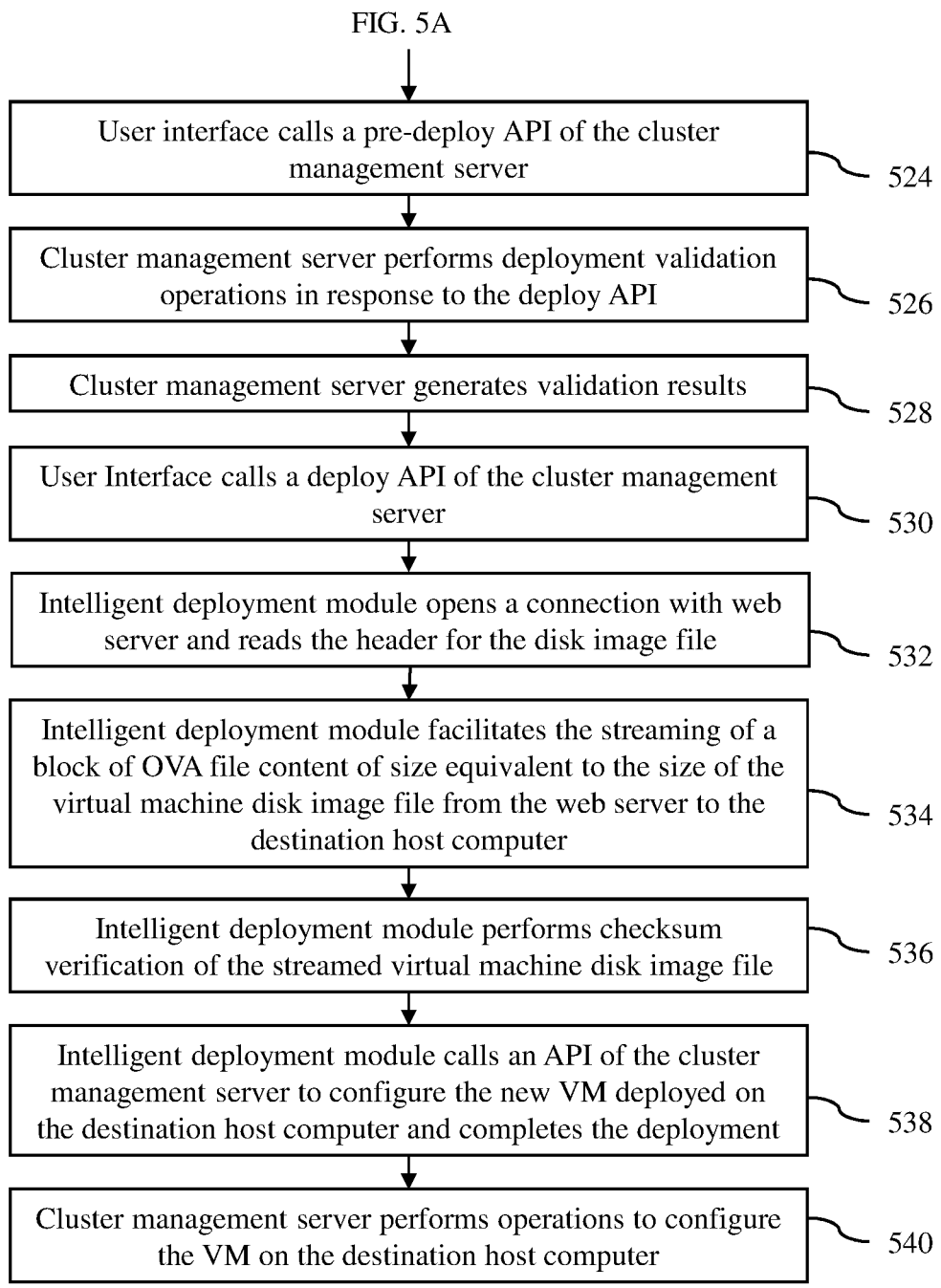

The process of deploying a VM from an OVA template file stored on a web server using the intelligent deployment module 108 in accordance with an embodiment of the invention is described using an example shown in FIG. 4 and the process flow diagram of FIGS. 5A and 5B. As shown in FIG. 4, in this use case, the OVA template file is stored on the web server 104 in the storage 114 and the VM is being deployed on the host computer H-1.

As shown in FIG. 5A, the deployment process begins at step 502, where a user interface for the cluster management server 106, such as the user interface 112 shown in FIG. 4, transmits a request for a VM deployment from OVA file to the intelligent deployment module 108 in response to user inputs to initiate a VM deployment. The VM deployment request includes a Uniform Resource Locator (URL) for the OVA template file and may also include the name or identification of the destination host computer on which the VM is to be deployed, e.g., the host computer H-1 shown in FIG. 4.

Next, at step 504, the intelligent deployment module 108 creates a deployment session at the cluster management server 106 for the VM deployment. A deployment session is an entity to track the whole deployment operation that involves multiple stages and may take a significant amount of time. In an embodiment, the user can get the state of the deployment operation by calling get( ) API on the deployment session, and can call pre-deploy API to validate the deployment and deploy API to finish the deployment. If any error happens during the operation, the user can find out the reasons via the session. Once the deployment is done, the session state becomes completed and can be deleted.

Next, at step 506, the intelligent deployment module 108 opens a connection with the web server, such as the web server 104 shown in FIG. 4, using the URL and reads the header for the first OVA entry of the OVA template file, which is the entry for the OVF descriptor file, to extract the file size of the OVF descriptor file. Thus, by reading this header, the intelligent deployment module is able to locate the OVF descriptor file. This step involves streaming the first predefined data block of the first OVA entry of the OVA file, which includes the header for the OVF descriptor file and then pausing the stream to determine the size of the OVF descriptor file.

Next, at step 508, the intelligent deployment module 108 streams a block of OVA file content of size equivalent to the size of the OVF descriptor file from the web server to download only the OVF descriptor file. This step is illustrated in FIG. 4, which shows the OVF descriptor file being downloaded from the web server 104 to the intelligent deployment module 108. Next, at step 510, the intelligent deployment module reads the OVF descriptor file to find out the files contained in the OVA file. Thus, the intelligent deployment module can then know which files to pull from the OVA file for the deployment.

Next, at step 512, if the OVA file has a manifest file, a certificate file and/or a message bundle file, the intelligent deployment module 108 searches and reads each of these filed contained in the OVA file. In some OVA files, one or more these files may not be present. Thus, depending on the OVA file, the intelligent deployment module may not retrieve any manifest, certificate and message bundle files, or retrieve one or more of these files. The process of searching and reading the manifest, certificate or message bundle file may involve reading the header of the desired file to locate the desired file and to extract the size of the desired file, and then streaming a block of OVA file content of size equivalent to the size of the desired file from the web server to download only the desired file. In an embodiment, the header of the manifest, certificate or message bundle file may be found by streaming the predefined data block of each subsequent OVA entry of the OVA file until the header for the manifest, certificate or message bundle file is found, which is indicated by the file name contained in the header, and then pausing the stream to determine the size of the desired file. Each header of the subsequent OVA entry may be found by reading the header of the previous OVA entry and then jumping to the next OVA entry since the size of the previous OVA entry can be derived from its header. In this fashion, one or more of the manifest, certificate and message bundle files (if available in the OVA file) may be streamed to the intelligent deployment module. This step is illustrated in FIG. 4, which shows the manifest, certificate and message bundle files being downloaded from the web server 104 to the intelligent deployment module 108.

Next, at step 514, the intelligent deployment module 108 parses the OVF descriptor file to extract data from the file, such as the checksum of the OVF descriptor file. Next, at step 516, the intelligent deployment module validates the checksum of the OVF descriptor file.

Next, at step 518, the intelligent deployment module 108 performs integrity and authenticity checks using the contents of the manifest file and/or certificate file (if available in the OVA file). In an embodiment, the intelligent deployment module may check to see if the manifest file and/or certificate file are in the same directory as the OVF descriptor and has the same base name. In addition, in this step, the checksum of the manifest file and/or the certificate may be validated.

Next, at step 520, the intelligent deployment module 108 performs message validation on the message bundle file (if available in the OVA file). In an embodiment, this step involves parsing the message bundle file to retrieve a message contained in the message bundle and also parsing the OVF descriptor file again to retrieve a message contained in the OVF descriptor file to determine if the messages match. In addition, in this step, the checksum of the message bundle file may be validated. Next, at step 522, the intelligent deployment module closes the connection with the web server 104.

Next, at step 524 (shown in FIG. 5B), the user interface 112 calls a pre-deploy application programming interface (API) of the cluster management server 106. Next, at step 526, the cluster management server performs deployment validation operations in response to the deploy API. Deployment validation operations may include determining whether the host computer on which the VM is to be deployed meets the hardware requirements of the VM, such as memory and CPU, and/or policy requirements of the VM being deployed and any existing VMs running on the host computer, such as affinity and anti-affinity requirements. In addition, in response to the pre-deploy API, the cluster management server may return other information, such as the available resources on the target host computer to which the user can choose to deploy the VM. Next, at step 528, the cluster management server generates validation results that can be used for the deployment of the VM in the destination host computer. Below is an example of the validation result that contains a warning of the OVF descriptor:

```
errors = [ ],
    warnings = [OvfWarning (com.vmware.vcenter.ovf.ovf_warning) => {
    category = INPUT,
    issues = <null>,
    name = PropertyParams.properties,
    value = {"non-configurable-
properties":[{"id":"vmname","type":"string","value":"sles-11-sp1-x86_64-va"}]},
```

```
message = LocalizableMessage (com.vmware.vapi.std.localizable_message) => {
    id = com.vmware.ovfs.ovfs-main.ovfs.found_non_user_configurable_properties,
    defaultMessage = Found non user configurable properties in the OVF descriptor
that are not included in PropertyParams.properties: {"non-configurable-
properties":[{"id":"vmname","type":"string","value":"sles-11-sp1-x86_64-va"}]}.,
    args = [PropertyParams.properties, {"non-configurable-
properties":[{"id":"vmname","type":"string","value":"sles-11-sp1-x86_64-va"}]}]
    },
    error = <null>
}]
```

Next, at step 530, the user interface 112 call a deploy API of the cluster management server 106. Next, at step 532, in response to the deploy API, the intelligent deployment module 108 opens a connection with the web server 104 using the URL and reads the header for the virtual machine disk image file to locate the virtual machine disk image file and to extract the size of virtual machine disk image file.

Next, at step 534, the intelligent deployment module 108 facilitates the streaming of a block of OVA file content of size equivalent to the size of the virtual machine disk image file from the web server to the destination host computer, which stores the virtual machine disk image file in the storage of the destination host computer. This step is illustrated in FIG. 4, which shows the vmdk file being downloaded from the web server 104 to the destination host computer H-1, i.e., from the storage 114 to the storage 110 via the web server 104, the intelligent deployment module 108 and the host computer H-1. In an embodiment, this step involves performing several substeps. In the first substep, the intelligent deployment module calls a deploy API of the cluster management server 106 to get a deploy lease. The lease is to allow the client computer to transfer content to the destination HTTPS server on the host computer. A lease can expire, and a client computer can only upload content when the lease is in a ready state. In the second substep, the intelligent deployment module gets one or more destination URLs of the target host computer from the deploy lease result. In the third substep, the intelligent deployment module initiates the streaming of the virtual machine disk image file from the web server to the destination host computer. This step follows similar substeps as the streaming of OVF descriptor. The intelligent deployment module knows what disk file names that need to be transferred, so it opens a connection to the web server, scans the headers of the OVF file, and streams the disk file in the OVA file if the file name matches.

Next, at block 536, the intelligent deployment module 108 performs checksum verification of the streamed virtual machine disk image file. The checksum is calculated on the intelligent deployment module when streaming the content of the disk file. So when the streaming finishes, the intelligent deployment module will compare the calculated checksum of the disk file to the checksum in the manifest file to validate.

Next, at block 538, the intelligent deployment module 108 calls an API of the cluster management server 106 to configure the new VM deployed on the destination host computer and completes the deployment. Next, at step 540, the cluster management server 106 performs operations to configure the VM on the destination host computer. In an embodiment, this step involves three substeps. In the first substep, the cluster management server ends the deployment lease. In the second substep, the cluster management server applies customization on the guest operating system of the VM, such as customization of computer name, IP settings, etc., if specified by the cluster management server. In the third step, the cluster management server closes the deploy session.

Figure 6:
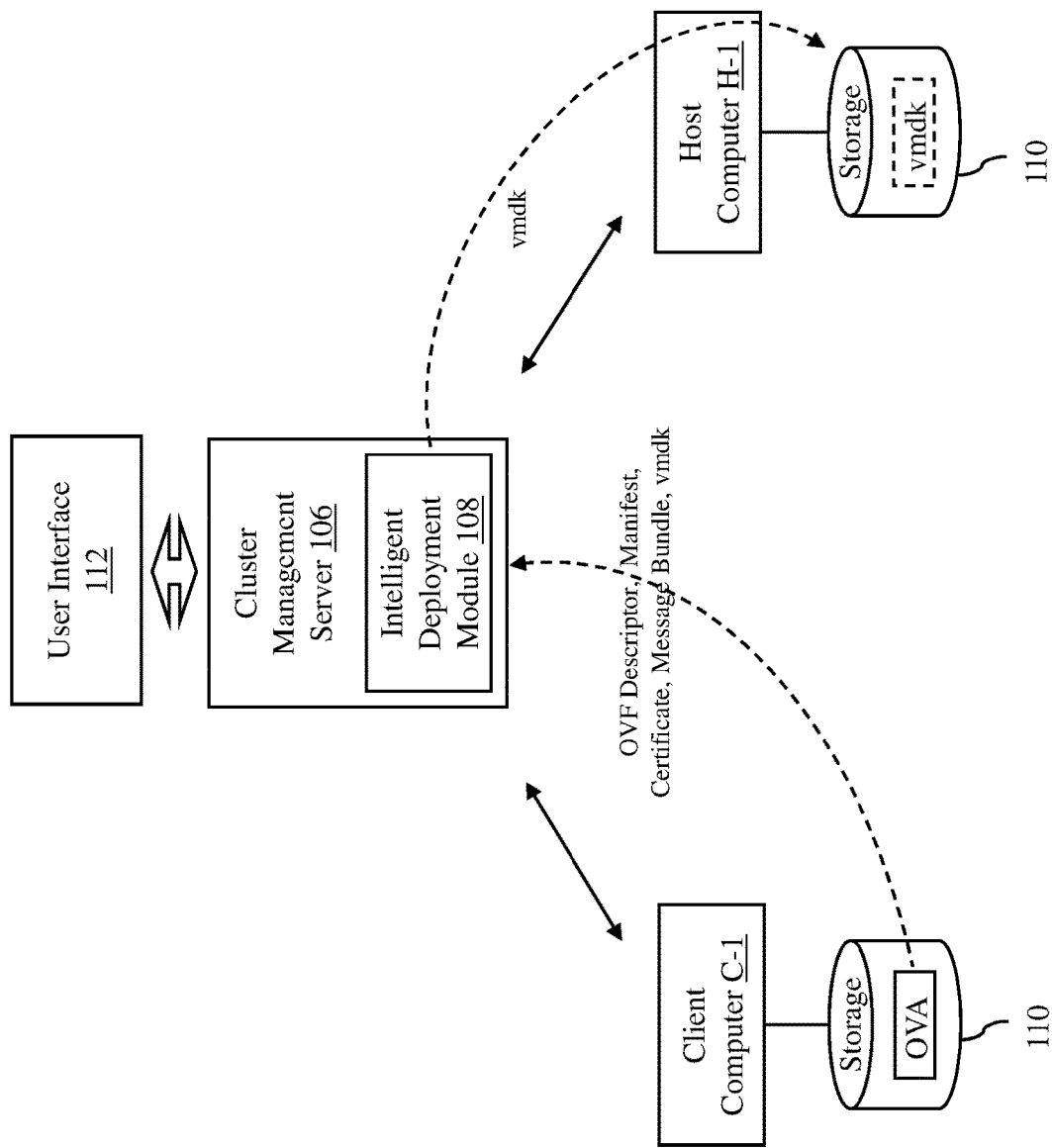
FIG. 6 is a diagram illustrating a VM being deployed from an OVA template file stored on a client computer in accordance with an embodiment of the invention.
Figure 7A:
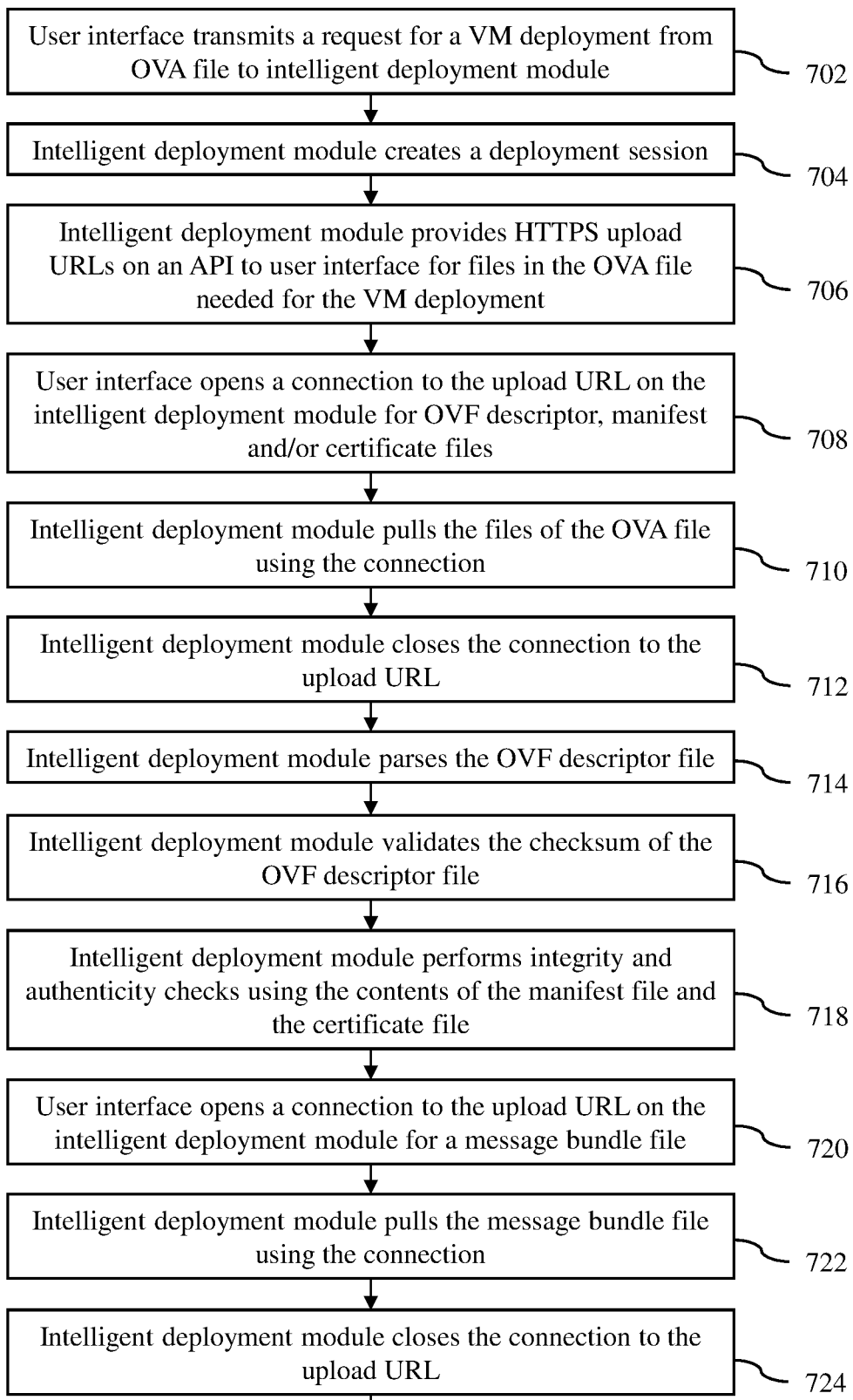
FIGS. 7A and 7B show a flow diagram of a process of deploying a VM from an OVA template file stored on a client computer in accordance with an embodiment of the invention.
Figure 7B:
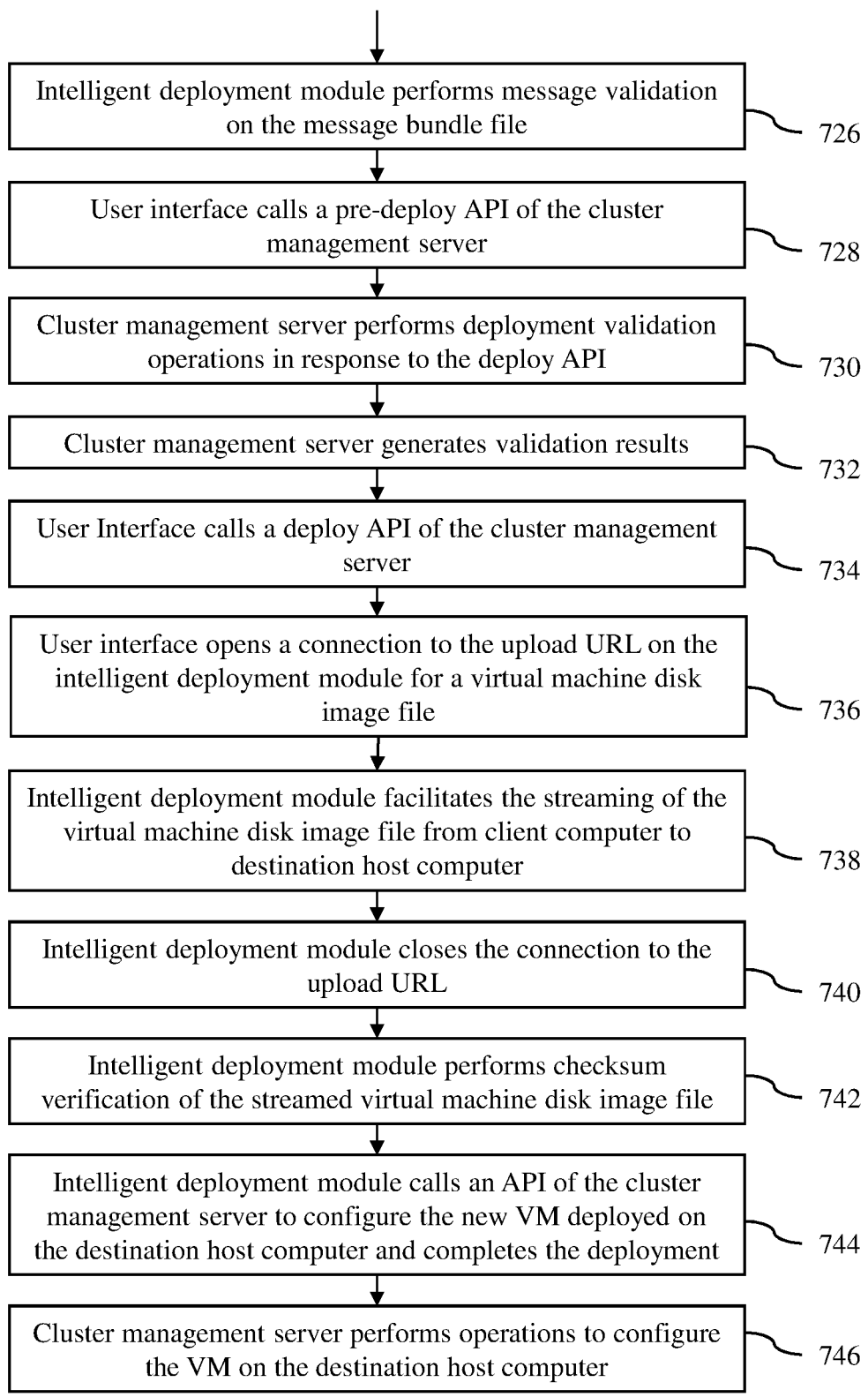

The process of deploying a VM from an OVA template file stored on a client computer using the intelligent deployment module 108 in accordance with an embodiment of the invention is described using an example shown in FIG. 6 and the process flow diagram of FIGS. 7A and 7B. As used herein, a client computer is any network-connected computing device, such as a laptop computer or a desktop computer, on which a user is making a request to deploy a VM on a destination host computer from an OVA file stored in the local storage of the computing device. Thus, the client computer can be viewed as being a server, which provides the OVA file from which to deploy a VM. As shown in FIG. 6, in this use case, the OVA template file is stored on a client computer C-1 in its local storage 610 and the VM is being deployed on the destination host computer H-1.

As shown in FIG. 7A, the deployment process begins at step 702, where a user interface for the cluster management server 106, such as the user interface 112 shown in FIG. 6, transmits a request for a VM deployment from OVA file to the intelligent deployment module 108 in response to user inputs to initiate a VM deployment. The VM deployment request includes a storage address for the OVA template file on the source client computer and may also include the name or identification of the destination host computer on which the VM is to be deployed, e.g., the host computer H-1 shown in FIG. 6.

Next, at step 704, the intelligent deployment module 108 creates a deployment session at the cluster management server 106 for the VM deployment.

Next, at step 706, the intelligent deployment module 108 provides one or more HTTPS upload URLs on an API to the user interface 112, which can be used to stream the OVA file from the source client computer to the intelligent deployment module to selectively transfer files in the OVA file needed for the VM deployment to the intelligent deployment module. These files in the OVA file include an OVF descriptor file and may include one or more of manifest, certificate and message bundle files.

Next, at step 708, the user interface 112 opens a connection to the upload URL on the intelligent deployment module 108 for the OVF descriptor file and the manifest and certificate files (if available in the OVA file). Next, at step 710, the intelligent deployment module pulls the OVF descriptor, manifest and/or certificate files of the OVA file using the connection. Next, at step 712, the intelligent deployment module closes the connection to the upload URL after the OVF descriptor, manifest and/or certificate files have been received by the intelligent deployment module. These steps are illustrated in FIG. 6, which shows the OVF descriptor, manifest and certificate files being pulled from the client computer C-1 to the intelligent deployment module 108. In an embodiment, when the user interface opens the connection to the upload URL for the OVA descriptor, manifest and/or certificate files, the source client computer will try to push the entire OVA file to the intelligent deployment module. However, the intelligent deployment module will only pull the OVA descriptor, manifest and/or certificate files (depending on which of these files are available in the OVA file) by looking at the headers of OVA entries in the OVA file, e.g., the file name specified in each header of the OVA entries. The OVF descriptor file is typically the first file of the OVA file, followed by the manifest and/or certificate files. Thus, only a beginning portion of the OVA file is needed to retrieve the OVA descriptor, manifest and/or certificate files. After the necessary files have been pulled to the intelligent deployment module, the intelligent deployment module will close the connection before the entire OVA file is transferred to the intelligent deployment module so that the rest of the OVA file is not unnecessarily streamed to the intelligent deployment module.

Next, at step 714, the intelligent deployment module 108 parses the OVF descriptor file to extract data from the file, such as the checksum of the OVF descriptor file. The parsing of the OVF descriptor will also allow the intelligent deployment module to determine whether the OVA file has a message bundle file. The OVF descriptor will also indicate the presence of a virtual machine disk image file in the OVA file. Next, at step 716, the intelligent deployment module validates the checksum of the OVF descriptor file.

Next, at step 718, the intelligent deployment module 108 performs integrity and authenticity checks using the contents of the manifest file and/or certificate file (if available in the OVA file). In an embodiment, the intelligent deployment module may check to see if the manifest file and/or certificate file are in the same directory as the OVF descriptor and has the same base name. In addition, in this step, the checksum of the manifest file and/or the certificate may be validated.

Next, at step 720, the user interface 112 opens a connection to the upload URL on the intelligent deployment module 108 for the message bundle file (if available in the OVA file as indicated in the OVF descriptor). Next, at step 722, the intelligent deployment module pulls the message bundle file of the OVA file using the connection. Next, at step 724, the user interface 112 closes the connection to the upload URL after the message bundle file has been received by the intelligent deployment module. These steps are illustrated in FIG. 6, which shows the message bundle file being pulled from the client computer C-1 to the intelligent deployment module 108. In an embodiment, when the user interface opens the connection to the upload URL for the message bundle file, the source client computer will again try to push the entire OVA file to the intelligent deployment module. However, the intelligent deployment module will only pull the message bundle file by looking at the headers of OVA entries in the OVA file, e.g., the file name specified in each header of the OVA entries. After the message bundle file has been pulled to the intelligent deployment module, the user interface will close the connection before the entire OVA file is transferred to the intelligent deployment module so that the rest of the OVA file is not unnecessarily streamed to the intelligent deployment module.

Next, at step 726 (shown in FIG. 7B), the intelligent deployment module 108 performs message validation on the message bundle file (if available in the OVA file). In an embodiment, this step involves parsing the message bundle file to retrieve a message contained in the message bundle and also parsing the OVF descriptor file again to retrieve a message contained in the OVF descriptor file to determine if the messages match. In addition, in this step, the checksum of the message bundle file may be validated.

Next, at step 728, the user interface 112 calls a pre-deploy application programming interface (API) of the cluster management server 106. Next, at step 730, the cluster management server performs deployment validation operations in response to the deploy API. Deployment validation operations may include determining whether the host computer on which the VM is to be deployed meets the hardware requirements of the VM, such as memory and CPU, and/or policy requirements of the VM being deployed and any existing VMs running on the host computer, such as affinity and anti-affinity requirements. In addition, in response to the pre-deploy API, the cluster management server may return other information, such as the available resources on the target host computer to which the user can choose to deploy the VM. Next, at step 732, the cluster management server generates validation results that can be used for the deployment of the VM in the destination host computer.

Next, at step 734, the user interface 112 call a deploy API of the cluster management server 106. Next, at step 736, in response to the deploy API, the user interface opens a connection to the upload URL on the intelligent deployment module for a virtual machine disk image file of the OVA file.

Next, at step 738, the intelligent deployment module 108 facilitates the streaming of the virtual machine disk image file from the client computer to the destination host computer, which stores the virtual machine disk image file in the storage of the destination host computer. Next, at step 740, the user interface 112 closes the connection to the upload URL after the virtual machine disk image file has been received by the destination host computer. This step is illustrated in FIG. 6, which shows the vmdk file being pulled from the client computer C-1 to the destination host computer H-1, i.e., from the storage 610 to the storage 110 via the client computer C-1, the intelligent deployment module 108 and the host computer H-1. In an embodiment, when the user interface opens the connection to the upload URL for the virtual machine disk image file, the source client computer will again try to push the entire OVA file to the intelligent deployment module. However, the intelligent deployment module will disregard other files of the OVA file and only pull the virtual machine disk image file (which is typically the last file in the OVA file) by looking at the headers of OVA entries in the OVA file, e.g., the file name specified in each header of the OVA entries. After the virtual machine disk image file has been pulled to the intelligent deployment module, the user interface will close the connection. If there is more than one virtual machine disk image file in the OVA file, the other virtual machine disk image file(s) will also be pulled to the destination host computer.

Next, at block 742, the intelligent deployment module 108 performs checksum verification of the streamed virtual machine disk image file.

Next, at block 744, the intelligent deployment module 108 calls an API of the cluster management server 106 to configure the new VM deployed on the destination host computer and completes the deployment. Next, at step 746, the cluster management server performs operations to configure the VM on the destination host computer. In an embodiment, this step involves three substeps. In the first substep, the cluster management server ends the deployment lease. In the second substep, the cluster management server applies customization on the guest operating system of the VM, such as customization of computer name, IP settings, etc., if specified by the cluster management server. In the third step, the cluster management server closes the deploy session.

As described above, the use of the intelligent deployment module 108 allows virtual processing instances, e.g., VMs, to be deployed on host computers using OVA template files stored on web servers or on any client computers without having to transfer the entire OVA template files to the cluster management server 106 to open and use the various files in the OVA template files for deployment. Thus, significant storage and/or network resources can be conserved using the intelligent deployment module.

Although the intelligent deployment module 108 has been described herein as being included in the cluster management server 106, in other embodiments, the intelligent deployment module may be running as a stand-alone module on a different management server or computer system.

In a particular implementation, the intelligent deployment module 108 is part of a content library management module (not shown) running on the cluster management server 106. The content library management module is configured to create and manage one or more content libraries. A content library is a repository for consumable software items, such as virtual machine (VM) templates and virtual application (vApp) templates, as well as other software items, such as ISO files, scripts and text files, for example. A VM template is a master image of a virtual machine that can be used to create new virtual machines. This image typically includes an operating system, applications and configuration settings for the virtual machine. A vApp template is a VM image that is loaded with an operating system, applications and data. vApp templates ensure that virtual machines are consistently configured across an entire organization. Thus, consumable software items can be software items that are used to clone, convert or deploy processing entities. A content library may be a publishing content library, which functions as a source of software items for other content libraries that are subscribed to the publishing content library, i.e., subscribed content libraries. A subscribed content library is a content library that allows the users of the subscribed content library to easily access and use the software items of the publishing content library to which the subscribed content library is subscribed. A single publishing content library may have multiple subscribed content libraries. Thus, the use of content libraries managed by multiple content library management modules running on a distributed computer system easily allows users to share and use software items, in particular the consumable software items. In this implementation, the functionalities of the intelligent deployment module are provided as another service for the content library management module running on the cluster management server 106.

Figure 8:
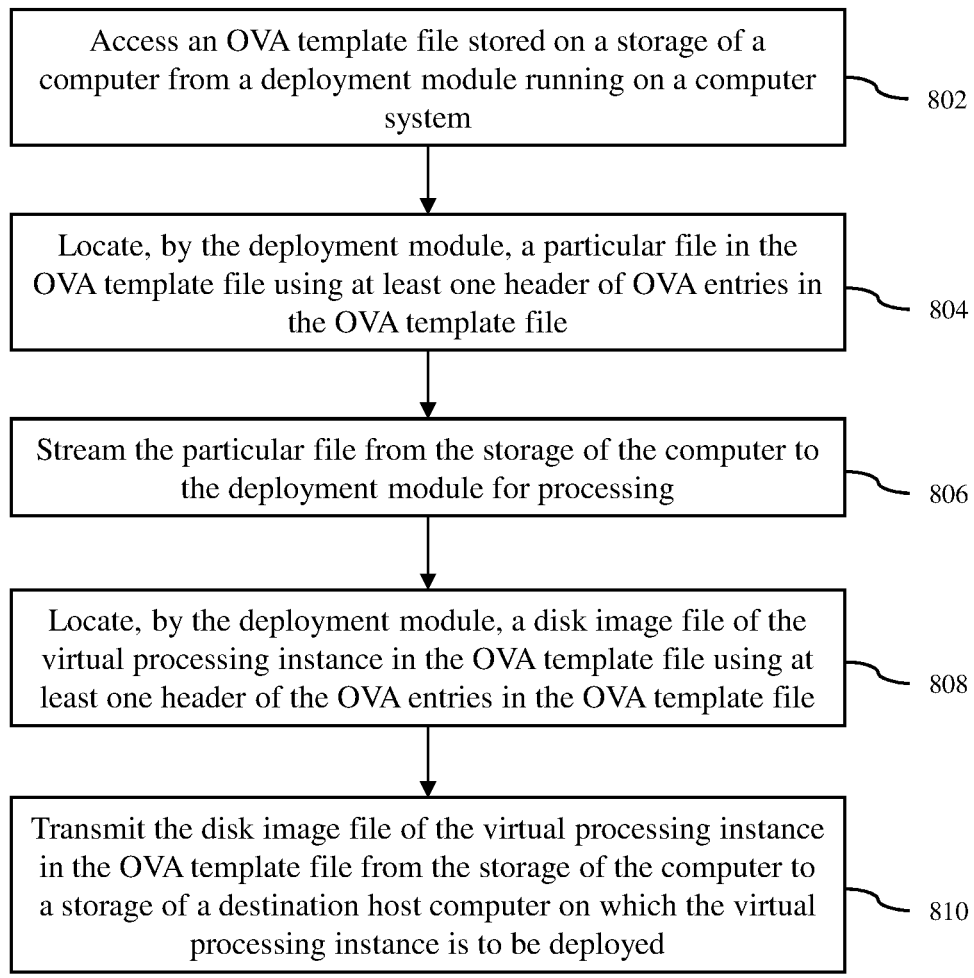
FIG. 8 is a flow diagram of a method for deploying a virtual processing instance from an OVA template file in accordance with an embodiment of the invention.

A method for deploying a virtual processing instance from an OVA template file in accordance with an embodiment of the invention is described with reference to a flow diagram of FIG. 8. At block 802, the OVA template file stored on a storage of a computer (e.g., a web server or a client computer) is accessed from a deployment module running on a computer system. At block 804, a particular file in the OVA template file is located by the deployment module using at least one header of OVA entries in the OVA template file. At block 806, the particular file is streamed from the storage of the computer to the deployment module for processing. At block 808, a disk image file of the virtual processing instance in the OVA template file is located by the deployment module using at least one header of the OVA entries in the OVA template file. At block 810, the disk image file of the virtual processing instance in the OVA template file is transmitted (e.g., downloaded or pulled) from the storage of the computer to a storage of a destination host computer on which the virtual processing instance is to be deployed.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A method for, deploying a virtual processing instance from an open virtual appliance (OVA) template file, the method comprising:
accessing the OVA template file stored on a storage of a first computer system from a deployment module running on a second computer system;
locating, by the deployment module, an open virtualization format (OVF) descriptor file in the OVA template file using at least one header of OVA entries in the OVA template file;

streaming the OVF descriptor file in the OVA template file from the storage of the first computer system to the deployment module for processing without streaming a disk image file of the virtual processing instance in the OVA template file;

after the OVF descriptor file has been streamed to the deployment module, executing at least one deployment-related operation using the OVF descriptor file at the deployment module;

locating, by the deployment module, the disk image file of the virtual processing instance in the OVA template file using at least one header of the OVA entries in the OVA template file; and transmitting the disk image file of the virtual processing instance in the OVA template file from the storage of the first computer system to a storage of a destination host computer on which the virtual processing instance is to be deployed.

2. The method of claim 1, wherein accessing the OVA template file includes accessing the OVA template file stored on a storage of a web server using a Uniform Resource Locator (URL).

3. The method of claim 1, wherein accessing the OVA template file includes accessing the OVA template file stored on a storage of a client computer using a connection to an upload Uniform Resource Locator (URL) on the deployment module.

4. The method of claim 1, wherein locating, by the deployment module, the OVF descriptor file includes reading a header of a first entry in the OVA template file to determine a size of the OVF descriptor file, and wherein streaming the OVF descriptor file includes streaming a block of the OVA template file of size equivalent to the size of the OVF descriptor file.

5. The method of claim 1, further comprising:
after the OVF descriptor file has been streamed to the deployment module, reading the OVF descriptor file to determine whether the OVA template file includes certain files; and
streaming the certain files in the OVA template file from the storage of the first computer system to the deployment module, wherein the certain files are used to execute the at least one deployment-related operation by the deployment module.

6. The method of claim 5, wherein the certain files include a manifest file, a certificate file or a message bundle file.

7. The method of claim 1, wherein locating, by the deployment module, the disk image file of the virtual processing instance includes reading a header of an entry in the OVA template file that contains the disk image file to determine a size of the disk image file, and wherein transmitting the disk image file includes transmitting a block of the OVA template file of size equivalent to the size of the disk image file from the storage of the first computer system to the storage of the destination host computer.

8. The method of claim 1, wherein the virtual processing instance is a virtual machine and the image disk file is a disk image file of a virtual disk of the virtual machine being deployed.

9. A non-transitory computer-readable storage medium containing program instructions for deploying a virtual processing instance from an open virtual appliance (OVA) template file, wherein execution of the program instructions by one or more processors of a computer causes the one or more processors to perform steps comprising:

accessing the OVA template file stored on a storage of a first computer system from a deployment module running on a second computer system;

locating, by the deployment module, an open virtualization format (OVF) descriptor file in the OVA template file using at least one header of OVA entries in the OVA template file;

streaming the OVF descriptor file in the OVA template file from the storage of the first computer system to the deployment module for processing without streaming a disk image file of the virtual processing instance in the OVA template file;

after the OVF descriptor file has been streamed to the deployment module, executing at least one deployment-related operation using the OVF descriptor file at the deployment module;

locating, by the deployment module, the disk image file of the virtual processing instance in the OVA template file using at least one header of the OVA entries in the OVA template file; and transmitting the disk image file of the virtual processing instance in the OVA template file from the storage of the first computer system to a storage of a destination host computer on which the virtual processing instance is to be deployed.

10. The computer-readable storage medium of claim 9, wherein accessing the OVA template file includes accessing the OVA template file stored on a storage of a web server using a Uniform Resource Locator (URL).

11. The computer-readable storage medium of claim 9, wherein accessing the OVA template file includes accessing the OVA template file stored on a storage of a client computer using a connection to an upload Uniform Resource Locator (URL) on the deployment module.

12. The computer-readable storage medium of claim 9, wherein locating, by the deployment module, the OVF descriptor file includes reading a header of a first entry in the OVA template file to determine a size of the OVF descriptor file, and wherein streaming the OVF descriptor file includes streaming a block of the OVA template file of size equivalent to the size of the OVF descriptor.

13. The computer-readable storage medium of claim 9, further comprising:
after the OVF descriptor file has been streamed to the deployment module, reading the OVF descriptor file to determine whether the OVA template file includes certain files; and
streaming the certain files in the OVA template file from the storage of the first computer system to the deployment module, wherein the certain files are used to execute the at least one deployment-related operation by the deployment module.

14. The computer-readable storage medium of claim 13, wherein the certain files include a manifest file, a certificate file or a message bundle file.

15. The computer-readable storage medium of claim 9, wherein locating, by the deployment module, the disk image file of the virtual processing instance includes reading a header of an entry in the OVA template file that contains the disk image file to determine a size of the disk image file, and wherein transmitting the disk image file includes transmitting a block of the OVA template file of size equivalent to the size of the disk image file from the storage of the first computer system to the storage of the destination host computer.

16. The computer-readable storage medium of claim 9, wherein the virtual processing instance is a virtual machine and the image disk file is a disk image file of a virtual disk of the virtual machine being deployed.

17. A management server comprising:
    memory; and
    a processor configured to:
        access an open virtual appliance (OVA) template file stored on a storage of a computer system;
        locate an open virtualization format (OVF) descriptor file in the OVA template file using at least one header of OVA entries in the OVA template file;
        stream the OVF descriptor file in the OVA template file from the storage of the computer system to the management server for processing without streaming a disk image file of a virtual processing instance in the OVA template file;
        after the OVF descriptor file has been streamed to the management server, execute at least one deployment-related operation using the OVF descriptor file;
        locate the disk image file of the virtual processing instance in the OVA template file using at least one header of the OVA entries in the OVA template file; and
        transmit the disk image file of the virtual processing instance in the OVA template file from the storage of the first computer system to a storage of a destination host computer on which the virtual processing instance is to be deployed.

18. The management server of claim 17, wherein the processor is configured to access the OVA template file stored on a storage of a web server using a Uniform Resource Locator (URL).

19. The management server of claim 17, wherein the processor is configured to access the OVA template file includes accessing the OVA template file a storage of a client computer using a connection to an upload Uniform Resource Locator (URL).

20. The management server of claim 17, wherein the processor is further configured to:
    after the OVF descriptor file has been streamed to the management server, read the OVF descriptor file to determine whether the OVA template file includes certain files; and
    stream the certain files in the OVA template file from the storage of the computer system to the management server, wherein the certain files are used to execute the at least one deployment-related operation.

* * * * *